(12) United States Patent
Luke et al.

(10) Patent No.: US 7,283,841 B2
(45) Date of Patent: Oct. 16, 2007

(54) TRANSFORMING MEDIA DEVICE

(75) Inventors: Hok-Sum Horace Luke, Mercer Island, WA (US); Sayim Kim, Seattle, WA (US); Kabir Siddiqui, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 21 days.

(21) Appl. No.: 11/177,933

(22) Filed: Jul. 8, 2005

(65) Prior Publication Data

US 2007/0010286 A1    Jan. 11, 2007

(51) Int. Cl.
*H04M 1/00* (2006.01)
(52) U.S. Cl. ............... 455/556.1; 455/575.3; 455/575.5; 348/333.02; 348/552; 379/428.01
(58) Field of Classification Search ............ 455/575.3, 455/575.1, 556.1, 575.5; 348/333.02, 552; 396/429; 379/428.01
See application file for complete search history.

(56) References Cited

U.S. PATENT DOCUMENTS

| | | | |
|---|---|---|---|
| 6,980,735 B2 * | 12/2005 | Horiguchi | 396/429 |
| 2003/0144036 A1 | 7/2003 | Ito | |
| 2003/0148753 A1 | 8/2003 | Pappalardo et al. | |
| 2004/0072589 A1 | 4/2004 | Hamamura et al. | |
| 2004/0162879 A1 | 8/2004 | Arcuri et al. | |
| 2004/0192220 A1 | 9/2004 | Huang et al. | |
| 2005/0020325 A1 * | 1/2005 | Enger et al. | 455/575.3 |
| 2005/0091431 A1 | 4/2005 | Olodort et al. | |
| 2005/0261040 A1 * | 11/2005 | Andersson et al. | 455/575.3 |
| 2005/0277439 A1 * | 12/2005 | Brelo et al. | 455/556.2 |
| 2006/0183512 A1 * | 8/2006 | Segawa et al. | 455/575.1 |
| 2007/0004451 A1 * | 1/2007 | Anderson | 455/556.1 |

OTHER PUBLICATIONS

Linux Smartphone Quick Reference Guide, http:/www.linuxdevices.com/articles/AT9423084269.html, 7 pages, downloaded from the internet Apr. 15, 2005.
Mot unveils pair of Windows Mobile powered handsets, http://www.windowsfordevices.com/news/NS3654397642.html, 4 pages, downloaded from the internet Apr. 15, 2005.
Multifunction Linux Mobile Phone Packs PDA Punch, http://linuxdevices.com/news/NS6443438627.html, 3 pages, downloaded from the internet Apr. 15, 2005.
Symbian:Symbian OS phones: FOMA D901I, http://www.symbian.com/phones/foma_d901i.html, 2 pages, downloaded from the internet May 23, 2005.

* cited by examiner

*Primary Examiner*—Danh Le
(74) *Attorney, Agent, or Firm*—Klarquist Sparkman, LLP

(57) ABSTRACT

Systems and methods are presented herein for creating and using a multi-function device that allows a user to transform the device into the desired feature-set form which permit access to that feature's functions, without a need for a user to traverse a series of interface menus to get to the desired functionality. In an exemplary embodiment, the device can be transformed into a phone, a media player, and a camera.

20 Claims, 8 Drawing Sheets

TRANSFORMING MEDIA DEVICE

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

BACKGROUND

Mobile communication devices, such as personal desktop assistants, contemporary mobile telephones, hand-held computers, tablet personal computers, laptop personal computers, wearable computers and the like are becoming popular user tools. In general, they have become small enough to be easily carried, consume little battery power, and, at the same time have become capable of containing more and more features, such as music players and cameras. However, most of the devices are built around a specific feature and to access a different feature (such as a camera on a phone-centric device), a user must navigate through several layers of user interface, which is not only time-consuming and cumbersome, but makes such devices difficult to use.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A communications device is presented that can be transformed into at least three different shapes, each of which represents a different feature set, by physically modifying the device. Three such possible shapes are a phone shape, a media shape, and a camera shape. When transformed, each shape presents an easy-to use interface that is automatically activated. When in any of the shapes, external actions, such as an outside phone call, can be received and processed—in the phone call example, the phone call could easily be answered even if the device were transformed into a different shape when the call came in.

Additional features and advantages will become apparent from the following detailed description of illustrated embodiments, which proceeds with reference to accompanying drawings.

DETAILED DESCRIPTION

The present application relates to technologies for transformable electronic devices. Described embodiments implement one or more of the described technologies.

Various alternatives to the implementations described herein are possible. For example, embodiments described with reference to flowchart diagrams can be altered by changing the ordering of stages shown in the flowcharts, by repeating or omitting certain stages, etc. As another example, although some implementations are described with reference to specific user interfaces, other user interfaces also can be used.

The various technologies can be used in combination or independently. Different embodiments implement one or more of the described technologies. Some technologies described herein can be used in a mobile computing device, such as a mobile telephone, a handheld computer, a wearable computing device, a PDA, a media player such as a portable video player, a digital music player, a CD player, or a camera. Other embodiments may be used in some other electronic device, for example a desktop computer, a computer game machine, a DVD, a laserdisc, a VCR, a video-CD player, a digital video recorder, or a device that possesses multiple functions such as a mobile telephone-camera, or a portable video player-digital music player. Any of these players may use various formats; for example, a digital music player may use, by way of illustration and not limitation, any combination of the following formats: MP3, WAV, OGG, WMA, or VQF.

I. Overview

Figure 3:
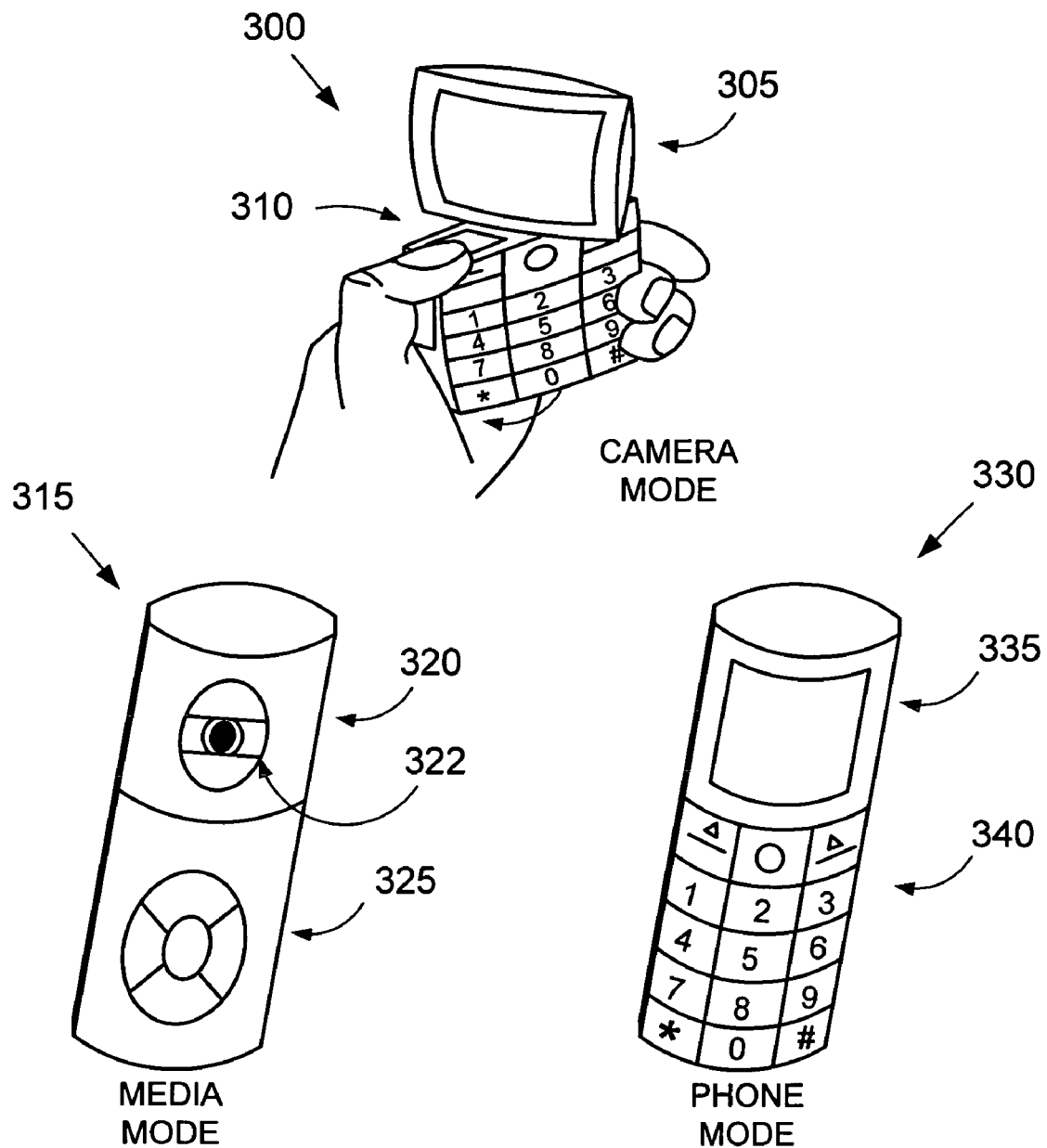
FIG. 3 is an illustration of several aspects of a transforming media device.

With reference to FIG. 3, systems and methods are presented herein for creating a multi-function device that allows a user to transform the device into the desired feature-set form which (substantially) instantly allows access to that feature's functions, without a need for a user to traverse a series of interface menus to get to the desired functionality. In an exemplary embodiment, the device comprises two portions that can be rotated. Different rotations create different formfactor devices.

The phone mode, shown at 330, shows what appears to be a typical phone with a keypad 340, and a display screen 335. Rotating the top portion 90 degrees transforms the device into camera mode, as shown at 300. Buttons 310 for camera-related features are within the natural grasp when holding the device. These camera feature buttons can be used as soon as the device is transformed. Rotating the top portion 90 more degrees presents the media mode, as shown at 315. The media mode has a media hardware device 325 which can be instantly accessed to play music or otherwise interact with the media functionality.

II. Computing Environment

Figure 1:
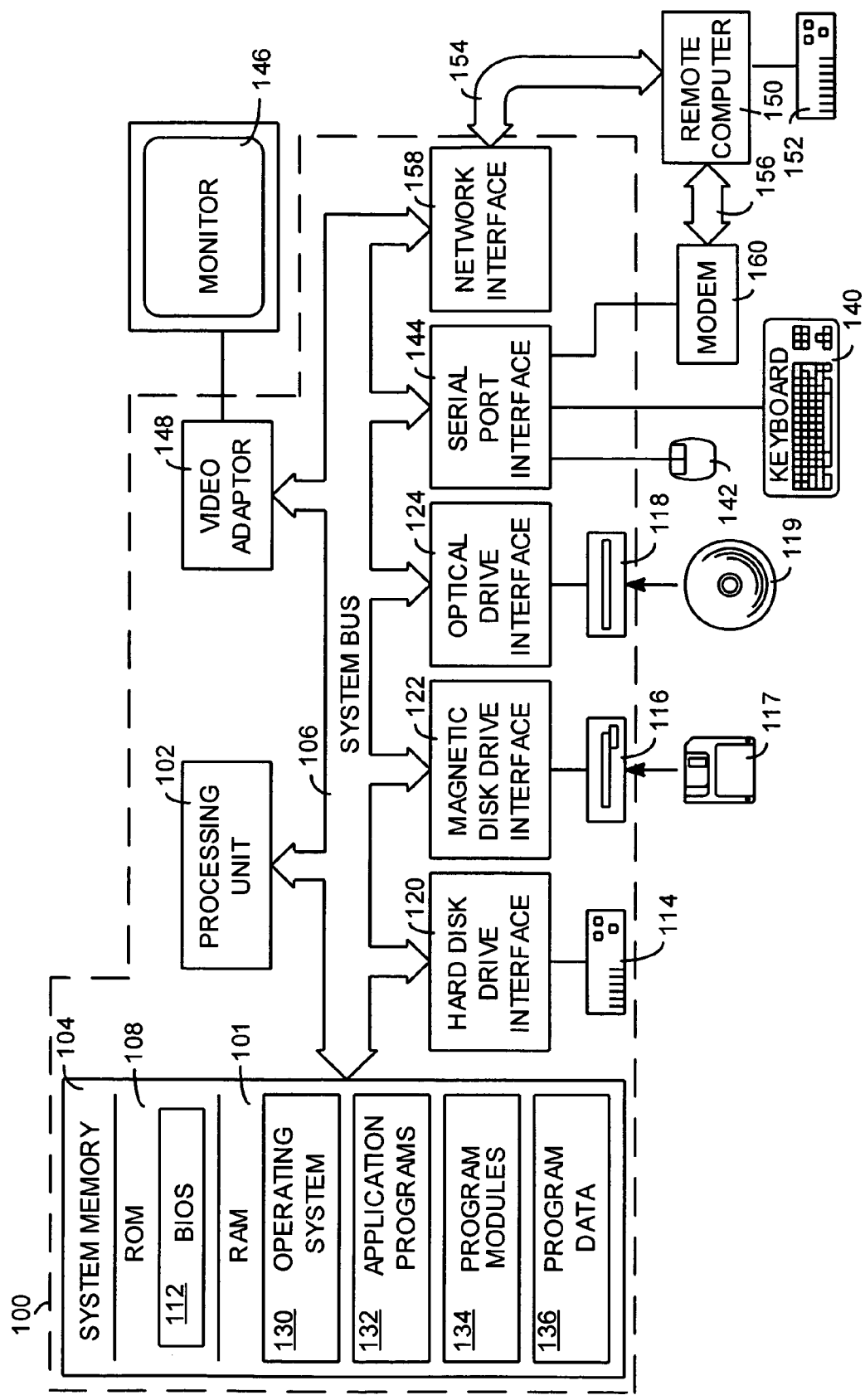
FIG. 1 is a block diagram of a suitable computing environment in conjunction with which described embodiments may be implemented.

With reference to FIG. 1, an exemplary system for implementing at least portions of the disclosed technology includes a general purpose computing device in the form of a conventional computer 100, which may be a PC, or a larger system, including a processing unit 102, a system memory 104, and a system bus 106 that couples various system components including the system memory 104 to the processing unit 102. The system bus 106 may be any of several types of bus structures, including a memory bus or memory controller, a peripheral bus, and a local bus using any of a variety of bus architectures. The system memory 104 includes read only memory (ROM) 108 and random access memory (RAM) 110. A basic input/output system (BIOS) 112, containing the basic routines that help with the transfer of information between elements within the computer 100, is stored in ROM 108.

The computer 100 further includes one or more of a hard disk drive 114 for reading from and writing to a hard disk (not shown), a magnetic disk drive 116 for reading from or writing to a removable magnetic disk 117, and an optical disk drive 118 for reading from or writing to a removable optical disk 119 (such as a CD-ROM or other optical media). The hard disk drive 114, magnetic disk drive 116, and optical disk drive 118 (if included) are connected to the system bus 106 by a hard disk drive interface 120, a magnetic disk drive interface 122, and an optical drive interface 124, respectively. The drives and their associated computer-readable media provide nonvolatile storage of computer-readable instructions, data structures, program modules, and other data for the computer 100. Other types of computer-readable media which can store data that is accessible by a computer, such as magnetic cassettes, flash memory cards, digital video disks, CDs, DVDs, RAMs, ROMs, and the like (none of which are shown), may also be used in the exemplary operating environment.

A number of program modules may be stored on the hard disk 114, magnetic disk 117, optical disk 119, ROM 108, or RAM 110, including an operating system 130, one or more application programs 132, other program modules 134, and program data 136. A user may enter commands and information into the computer 100 through input devices, such as a keyboard 140 and pointing device 142 (such as a mouse). Other input devices (not shown) may include a digital camera, microphone, joystick, game pad, satellite dish, scanner, or the like (also not shown). These and other input devices are often connected to the processing unit 102 through a serial port interface 144 that is coupled to the system bus 106, but may be connected by other interfaces, such as a parallel port, game port, or universal serial bus (USB) (none of which are shown). A monitor 146 or other type of display device is also connected to the system bus 106 via an interface, such as a video adapter 148. Other peripheral output devices, such as speakers and printers (not shown), may be included.

The computer 100 may operate in a networked environment using logical connections to one or more remote computers 150. The remote computer 150 may be another computer, a server, a router, a network PC, or a peer device or other common network node, and typically includes many or all of the elements described above relative to the computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets, and the Internet.

When used in a LAN networking environment, the computer 100 is connected to the LAN 154 through a network interface 158. When used in a WAN networking environment, the computer 100 typically includes a modem 160 or other means for establishing communications over the WAN 156, such as the Internet. The modem 160, which may be internal or external, is connected to the system bus 106 via the serial port interface 144. In a networked environment, program modules depicted relative to the computer 100, or portions thereof, may be stored in the remote memory storage device 152. The network connections shown are exemplary, and other means of establishing a communications link between the computers may be used.

III. Communication Device

Figure 2:
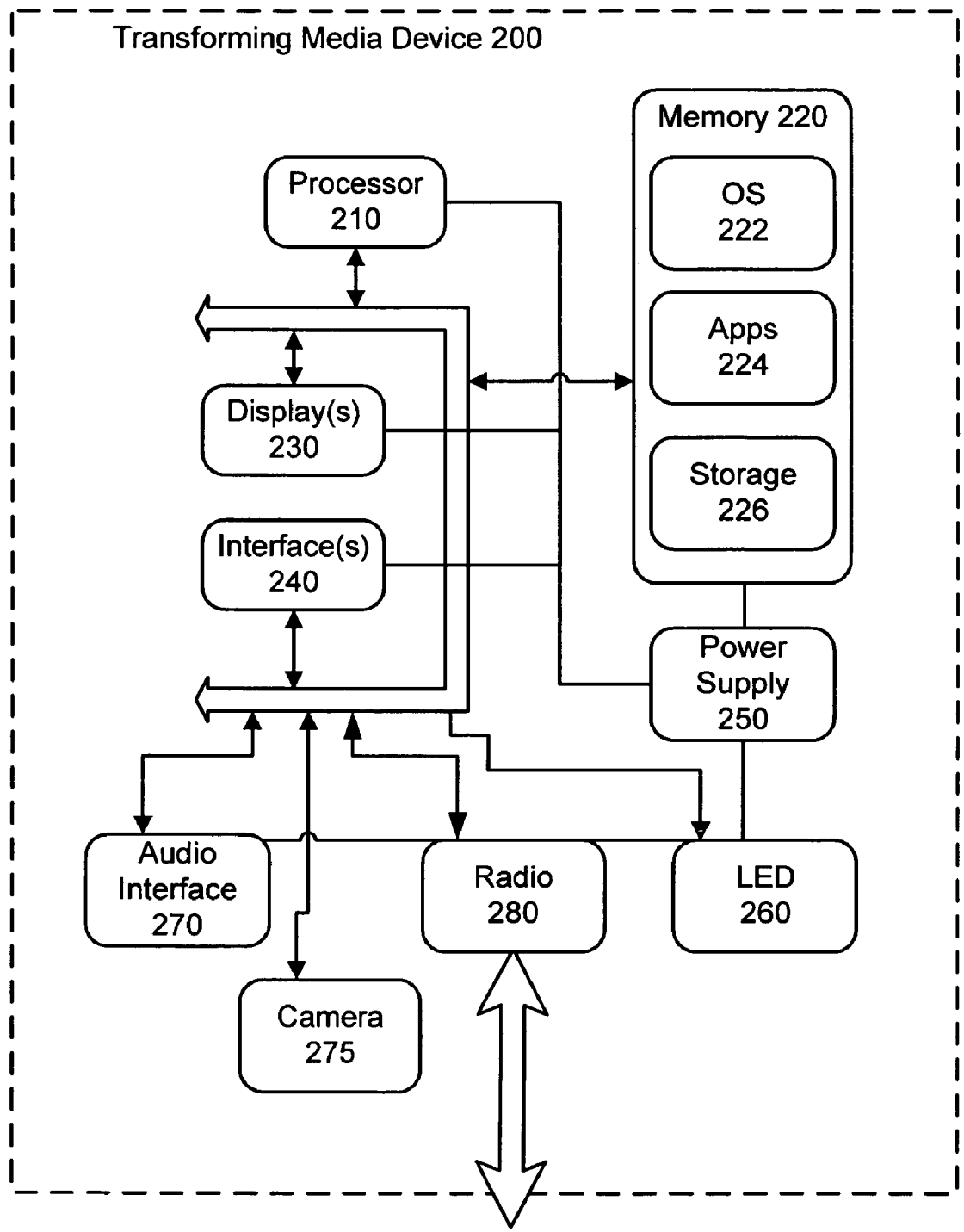
FIG. 2 is a block diagram of a suitable communication device in conjunction with which described embodiments may be implemented.

The computing environment may be in the form of a communication device, such as the communication device 200 illustrated as a functional block diagram in FIG. 2. In one implementation, the communication device 200 is a portable mobile communication device. The communication device 200 may be implemented as one or more desktop personal computers, multiprocessor systems, microprocessor-based or programmable consumer electronics, network PCs, and the like, such as those discussed with reference to FIG. 1.

The communication device 200 may include many more components than those shown in FIG. 2. The components shown, however, are sufficient to disclose an illustrative embodiment for implementing the disclosed tools and techniques.

As shown in FIG. 2, the communication device 200 includes a processor 210, a memory 220, one or more displays 230, and one or more input devices 240. The memory 220 generally includes both volatile memory (e.g., RAM) and non-volatile memory (e.g., ROM, Flash Memory, or the like). Flash memory may be easily removed and installed using a provided memory card hatch or another other easily insertable and removable memory device may be used. An infrared port may also be included.

The communication device 200 includes an operating system 222, such as the Windows Mobile operating system from Microsoft Corporation or other such operating system, which is resident in the memory 220 and executes on the processor 210. The input devices 240 may include one or more keypads. Each keypad may be a push-button numeric dialing pad (such as on a typical telephone) or a multi-key keyboard (such as a conventional keyboard). One or more keypads may be sliding, in that the keypad can slide at least partially into or under the communication device 200 reducing the overall footprint. Other input devices, such as click-wheels, touch pads, navigation buttons, joysticks, and so forth, may also be included. The display 230 may be a liquid crystal display, or any other type of display commonly used in mobile computing devices. For example, the display 230 may be touch-sensitive, and would then also act as an input device.

One or more application programs 224 are loaded into the memory 220 and run on the operating system 222. Examples of application programs include phone dialer programs, a switch manager, e-mail programs, calendar programs, word processing programs, spreadsheet programs, media play programs, camera function programs, and so forth. Camera programs may include picture editors, and may support many formats such as JPEG, PNG, NEVA, GIF, BMP, WBMP, and WPNG, as well as other known or inventive formats. The communication device 200 also includes a non-volatile storage 226 within the memory 220. The nonvolatile storage 226 may be used to store persistent information which should not be lost if the communication device 200 is powered down. The application programs 224 may use and store information in the storage 226, such as e-mail, SMS, MMS, or other messages used by an e-mail application, appointment information used by a calendar program, documents used by a word processing application, and the like. A synchronization application may also reside on the communication device 200 and is programmed to interact with a corresponding synchronization application resident on a host computer to keep the information stored in the storage 226 synchronized with corresponding information stored at the host computer.

The communication device 200 also includes a power supply 250, which may be implemented as one or more batteries. The power supply 250 might further include an external power source, such as an AC adapter or a powered docking cradle that supplements or recharges the batteries. A stereo headset port may also be included.

The communication device 200 is also shown with two types of external notification mechanisms: an LED 260 and an audio interface 270. Other components, such as one or more of the displays 230, and vibration devices (not shown) may also operate as notification mechanisms. These devices may be directly coupled to the power supply 250 so that when activated, they remain on for a duration dictated by the notification mechanism even though the processor 210 and other components might shut down to conserve battery power. The LED 260 may be programmed to remain on indefinitely until the user takes action to indicate the powered-on status of the device. The audio interface 270 is used to provide audible signals to and receive audible signals from the user. For example, the audio interface 270 may be coupled to a speaker for providing audible output and to a microphone for receiving audible input, such as to facilitate a telephone conversation. A camera device 275 may also be included. Such a camera device may have a flash, and may have zoom and pan capabilities.

The communication device 200 also includes a radio 280 that performs the function of transmitting and receiving radio frequency communication. The radio 280 facilitates wireless connectivity between the communication device 200 and the outside world, for example via a communication carrier or service provider. Transmissions to and from the radio 280 are conducted under control of the operating system 222. In other words, communications received by the radio 280 may be disseminated to the application programs 224 via the operating system 222, and vice-versa. The radio 280 allows the communication device 200 to communicate with other computing devices, such as over a network such as the Internet. Protocols such as Bluetooth, IrDA, or another known or inventive method might be used to provide such wireless networking. The radio 280 is an example of communication media discussed above.

IV. Display Layout Implementation

FIG. 3 is a diagram illustrating the layout of an exemplary computing device, such as the communication device 200 described above. Briefly, a communications device is presented that can be transformed to present at least three different orientations, each with a specific feature set. Transforming the device also activates a given feature set. The device comprises, most simply, two portions, a pivoting module and an interface module. Each of three features: a camera feature, a media play feature and a phone feature, can be activated by orienting the two modules in different ways. For example, the phone mode 330 has numeric keys and a directional pad 340 for phone number input and a display screen 335 within easy view. When the phone is in this mode, the phone interface is automatically activated.

The camera orientation 300 comprises the pivoting module 305 being rotated 90 degrees from the orientation it has in the phone mode 330. This exposes special camera buttons 310, and puts the device in camera mode such that camera functions (such as taking pictures) can be performed. Rotating the pivoting module another 90 degrees from the camera mode (180 degrees from the phone mode) places the device in media mode 315. Here, a media interface, such as a click-wheel or a navigation pad, is on the "front" of the device, and the device interface is instantly set to "media mode" allowing for functions such as the playback of stored music.

Figure 6:
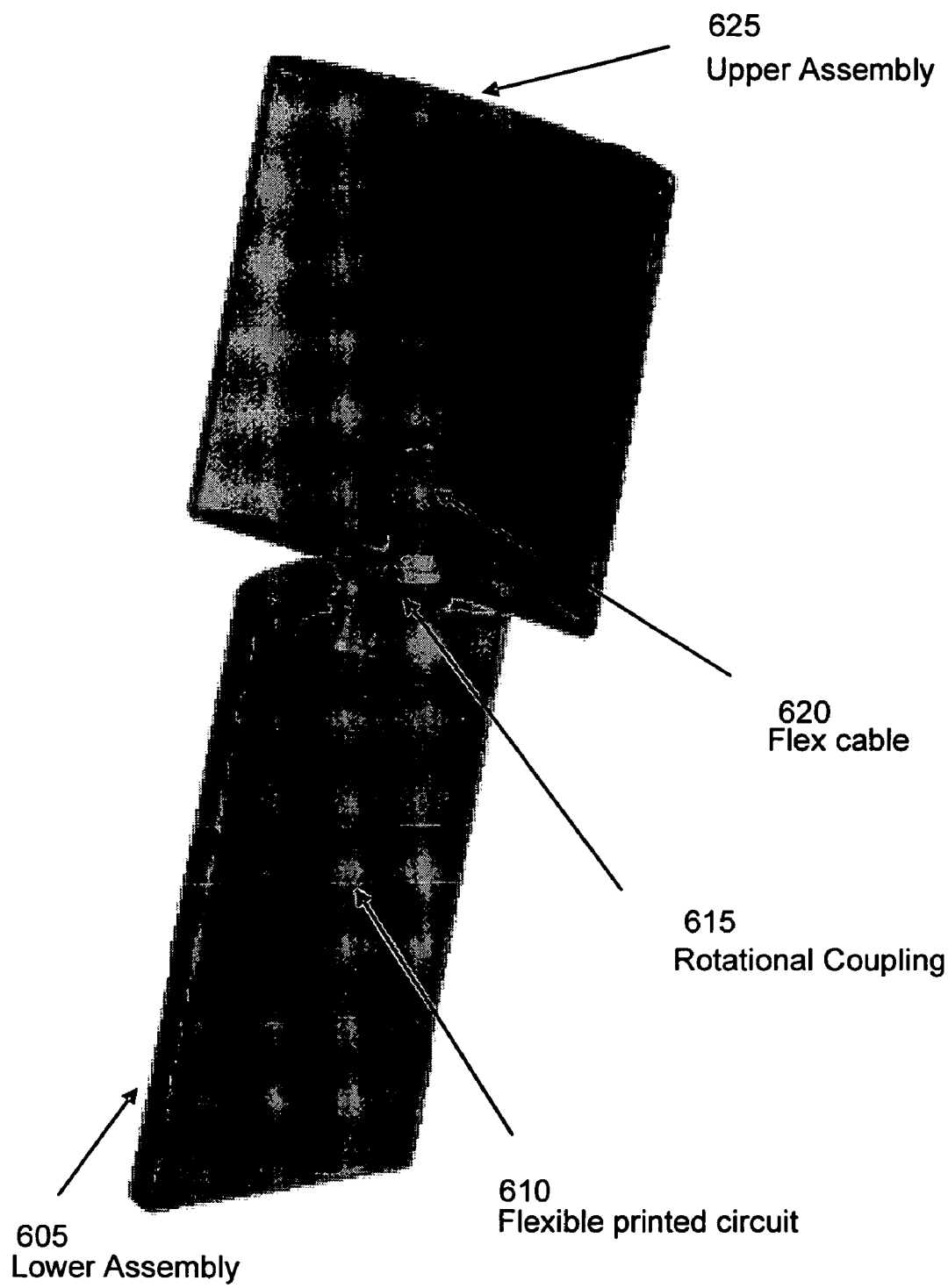
FIG. 6 is a diagram of a general system layout in conjunction with which described embodiments may be implemented.

FIG. 6 is a diagram illustrating the layout of an exemplary computing device such as (but not limited to) the portable communication device 300 described above. The device comprises a lower assembly 605 (the interface module) connected to an upper assembly 625 (the pivoting module) through a rotational coupling 615, which may also be thought of as a hinge mechanism. A flexible printed circuit board 610 is included within the lower assembly 605. As shown in FIG. 2, the processor 210 and memory 220, are most likely located on this printed circuit board 610.

The rotational coupling 615 further comprises a hole that a flex cable 620 runs through. A spring (not shown) is also included within the rotational coupling 615 which provides friction while the modules are rotating.

Figure 7:
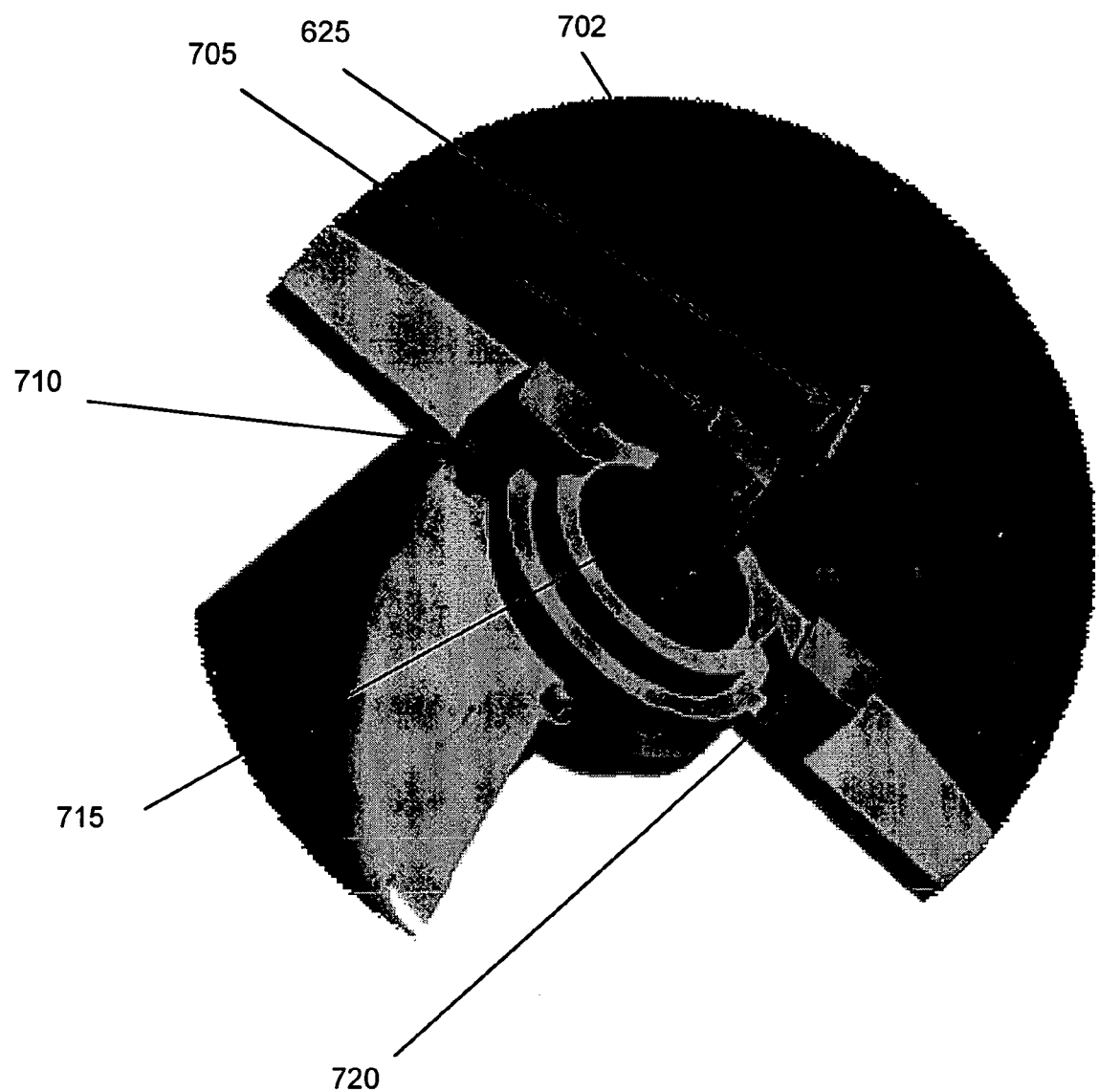
FIG. 7 is a diagram of a general rotational device layout in conjunction with which described embodiments may be implemented.

FIG. 7 shows an exemplary system to determine which orientation the media device is in. To give an idea of the orientation of the figure itself, the label 625 points to the upper assembly 625 of the device. A stationary activator 715 resides in the hole through the rotational coupling 615, also shared with the flex cable 620. The stationary activator 715 should be considered part of the lower half of the rotational coupling 615. The detector switch for the camera 705, the detector switch for the phone 710, and the detector switch for the media player 720 are all arranged at 90 degrees from each other around the outside of the rotational coupling 615 in such a manner that when the two sections of the device are rotated the appropriate angle relative to each other, the detector switch is engaged by the stationary activator 715. The location of the various switches at 90 degrees from each other in FIG. 7 is an exemplary embodiment, other orientations of the detector switches and of the associated relative rotations of the interface 605 and pivoting 625 modules are envisioned.

Figure 8:
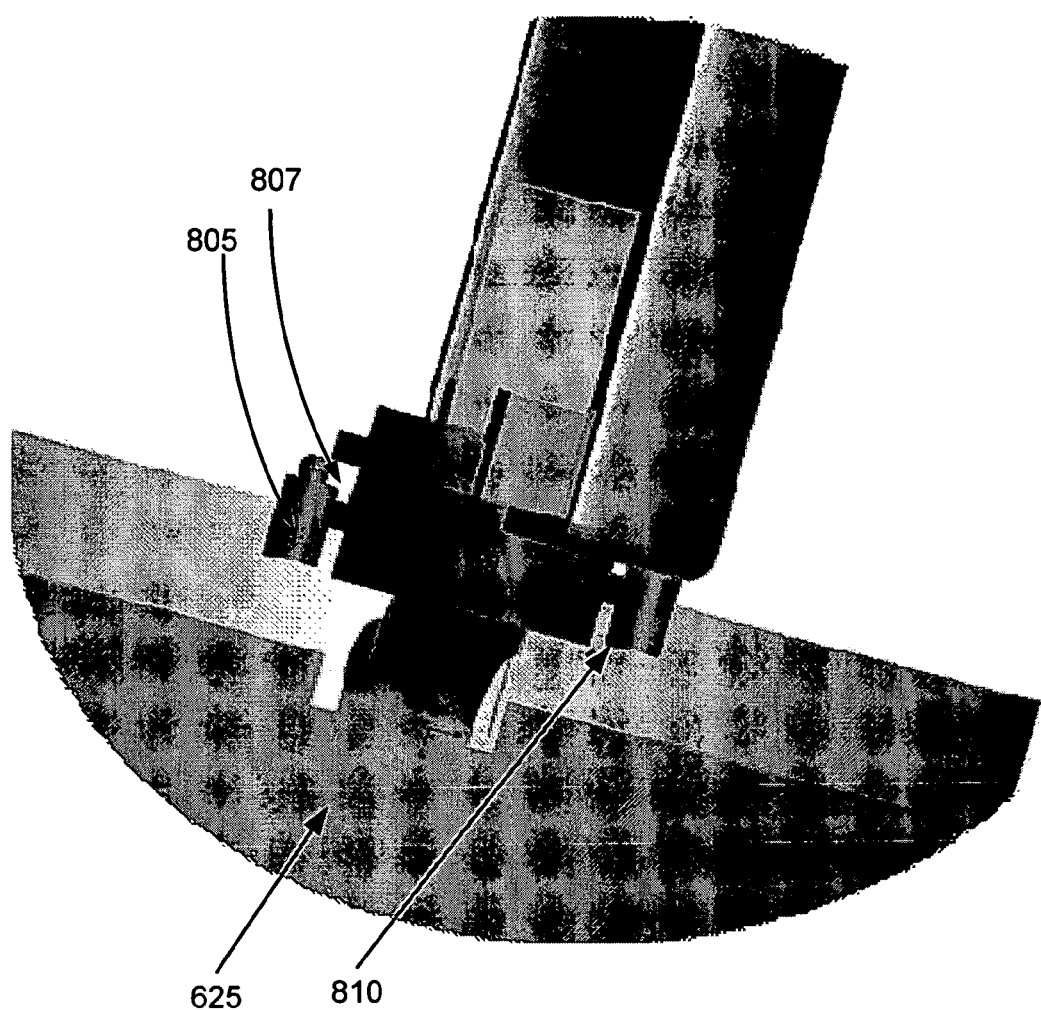
FIG. 8 is a diagram of another aspect of the general rotational device layout of FIG. 7 in conjunction with which described embodiments may be implemented.

FIG. 8 shows an exemplary method to lock the device into the desired orientation. The figure itself is oriented roughly 180 degrees from FIG. 7, as shown by the location of the upper assembly 625. A detent spring 805 is used to lock the device into the phone mode 330. Similarly, a detent spring 810 is used to lock the device into the camera mode 300. A similar device (not shown) is used to lock the device into the media mode 315. The detent spring 805 is shown in the unlocked position; the detent ball 807 is forced into a detent pocket (not shown) on the upper side of the lower assembly 605 by the action of the detent spring 805. This locks the device into place, as shown at 810.

V. Exemplary System for a Transforming Media Device

Figure 4:
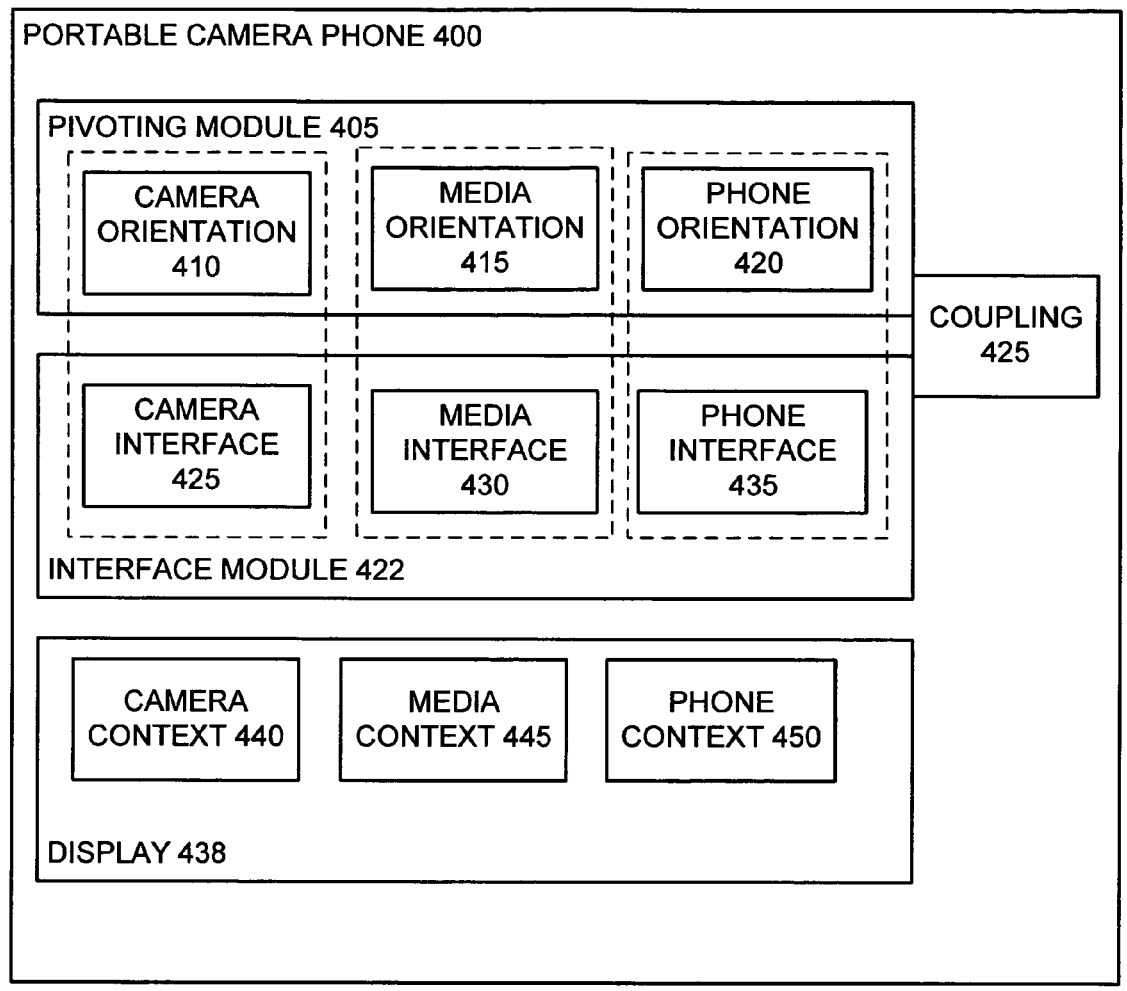
FIG. 4 is a functional block diagram illustrating an embodiment of an example communication device in conjunction with which described embodiments may be implemented.

Referring to FIG. 4, and with continuing reference to FIG. 3, block diagram of a portable communications device 400 shows an exemplary embodiment of the systems discussed herein.

The portable communication device 400 consists of a pivoting module 405 rotationally coupled 435 to an interface module 422. The pivoting module and the interface module are ergonomically designed such that the pivoting module easily rotates into its different aspects. The pivoting module consists of, at least, a camera orientation 410 a media orientation 415 and a phone orientation 420. The interface module consists of a camera interface 425 which is associated with the camera orientation 410, a media interface 430 associated with the media orientation 415, and a phone interface 435 associated with the phone orientation 420

With continuing reference to FIG. 3, when the pivoting module 405 is rotated into the camera orientation 410 as shown at 300, buttons 310 are exposed that can be used to operate the camera, such as zoom, pan, and focus buttons. In an exemplary embodiment, the camera orientation is 90 degrees from the phone orientation. Other interface objects (buttons, a wheel, etc.) are ergonomically placed to assist in easy camera operation. When the device is in camera orientation 300, the user can easily perform camera functions such as take a picture, view pictures, edit pictures, play movie mode, slide mode, edit mode, redeye mode, flash mode, zoom mode, or user-selectable mode, etc. A keypad associated with the phone mode may be able to be locked, or may automatically lock, when the device is in camera orientation.

In an exemplary embodiment, a subset of the possible camera functions are located on a tab-selector; when the communications device 400 is pivoted into the camera orientation, the last selection made by the user (such as take a picture) is instantly accessible to the user. Other choices on the tab selector may be (but are not limited to) play movie mode, slide mode, edit mode, redeye mode, flash mode, zoom mode, or user-selectable mode. The camera functions may also include a timer, spot photometry, choosing the photo size, night mode, and various special effects. The camera may also allow a user to create and play back movies, and may also comprise a special photo memory device.

When the device is not in the camera orientation, the camera lens 322 is optionally covered by a lens cover that automatically opens when the device is moved into camera orientation 410. Other embodiments require a user to manually remove the lens cover, or may not include a lens cover at all.

The media orientation 415, in an exemplary embodiment, is 90 degrees from the camera orientation 410 and 180 degrees from the phone orientation 420. When the device is in the media mode 315 (when the media orientation 415 and the media interface 430 line up, as shown at 315), a media interface is instantly turned on and using the media interface will perform media functions such as playing stored music, playing streamed audio content such as podcasts, playing videos (either previously downloaded, or from a streaming media), watching television, listening to the radio, downloading music from an external source, and other known or inventive methods. The device may allow music (or other audio data) to be played in stereo, and may include an equalizer. The hardware interface 430 becomes usable when the device is pivoted into the media orientation 415. The hardware interface can consist of a click wheel, navigation buttons, dedicated buttons (such as play, move forward a track, move back a track, fast forward, fast back, download), or another known or inventive interface.

The phone mode 330 comprises the phone orientation 420 and the phone interface 435 pivoting around the rotational coupling 435 such that they line up ergonomically. In an exemplary embodiment, this presents the user with an easily accessible display 335 and a numeric keypad 340 allowing straightforward phone dialing, phone answering, and so forth. Other phone configurations are also allowable; the keypad may be replaced or supplemented with an alphanumeric keyboard, or with some other sort of input device. When the device is in phone mode, phone functions, such as dialing a phone number, can be substantially instantly input without requiring further action (or requiring only minimal action) from a user.

A display 335 is present on the device, and most easily accessible from the phone mode 330. However, each of the modes has its own set of features and functions which is accessible from the display, and a portion of which (such as a beginning access screen) is automatically displayed when the device is placed in the appropriate mode. So, when the portable camera phone 400 is placed in the camera orientation 300 and 410, the display will show camera-related content such as pictures, photo-taking options, and so on.

When the portable camera phone is placed in the media orientation 315 and 415, media context 445 is displayed such as predefined playlists, the current song playing, download options, playlist creation options and so on. When the portable camera phone 400 is placed in the phone orientation 330 and 420, the phone context 450 is substantially automatically displayed. This phone context may be a home screen that displays status information such as the time, battery strength, signal strength, and so on, or may be more specific information, such as a phone number that is being dialed, the number of an incoming caller, contact information about a caller, and other appropriate information.

In any of the orientations, an outside event, such as receiving a phone call, may occur. When this happens, the phone call may be answered by selecting a dedicated hardware key while in an orientation other than the phone orientation, by rotating the device into the phone mode and then selecting a soft menu button, etc. Other outside actions, such as alarms, calendaring events, email notifications, and so on, may be handled in similar ways.

VI. Exemplary Method for a Transforming Media Device

Figure 5:
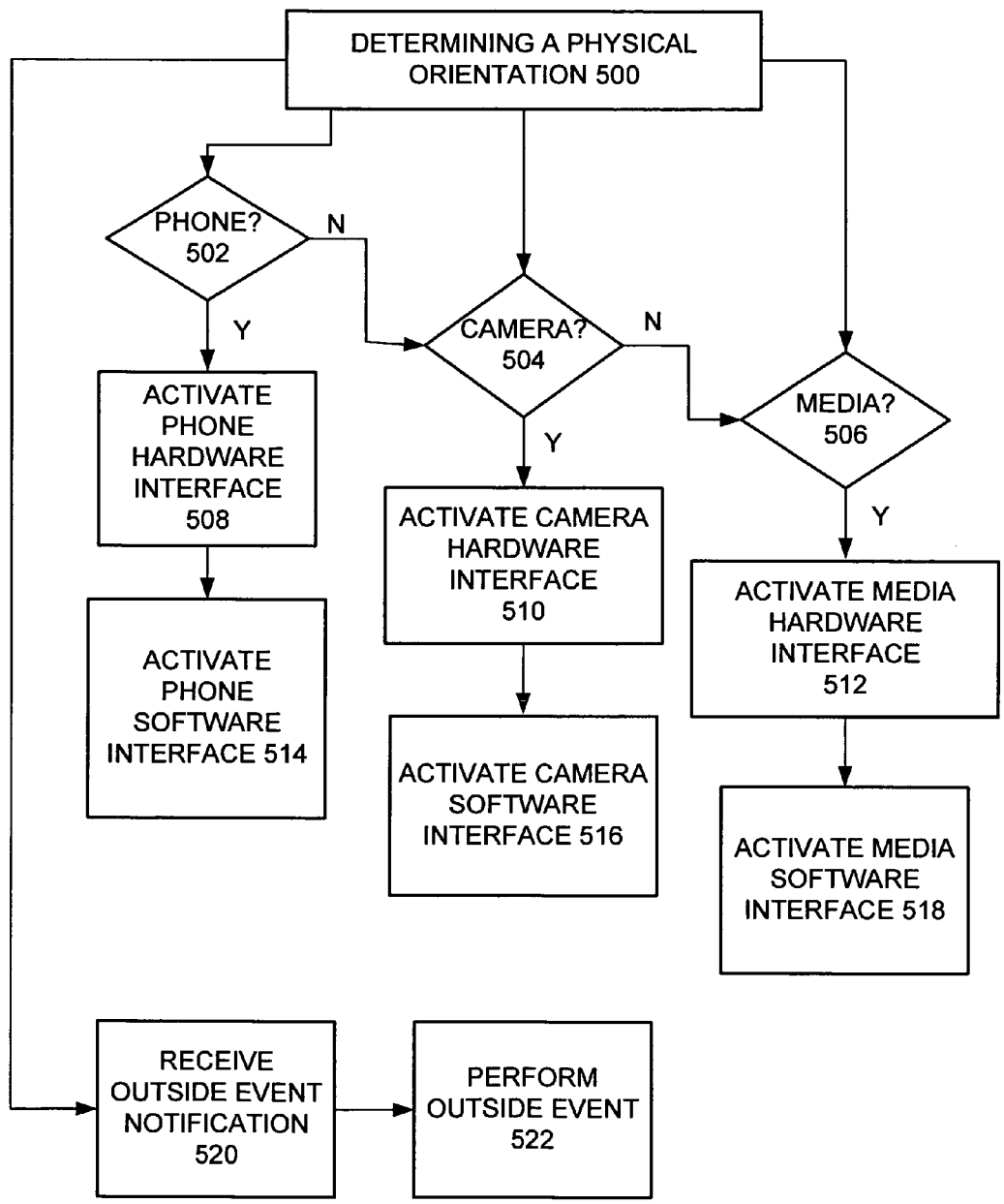
FIG. 5 is an operational flow diagram illustrating a process for moving between different communication device features in conjunction with which described embodiments may be implemented.

FIG. 5 is an operational flow diagram illustrating a process for transforming a communications device. The process begins at step 500 where a communication device determines which physical orientation it is in. An exemplary device has three possibilities, a phone orientation, a camera orientation and a media orientation. At decision block 502 the device determines if it is in a phone orientation. Once determined to be in a phone orientation, processing moves to block 508 where a phone hardware interface is activated. This activation, in an exemplary device, should occur automatically when the phone is determined to be in the phone orientation. At process block 514, a software interface is activated. An exemplary phone orientation is shown in FIG. 3 at 330, where a phone display screen and a keypad are oriented in traditional phone fashion, with the display 335 easily readable when a user is accessing the keypad 340. Dedicated hardware keys for common phone functions such as "Answer" and "Hang Up" may be present, and the display (the software interface 514) may also provide soft menu keys for a wider range of options than that allowed by a keypad alone. Even though a primarily numeric keypad is shown as the hardware interface 508, other input methods, such as an alphanumeric keypad, voice activation, a joystick, or even a click-wheel or an inventive method may be used for input.

At decision block 504 the phone is checked to see if it is in a camera orientation. Alternately, placing the phone in a camera orientation triggers the determining step. If in a camera orientation, then a camera hardware interface 510 turned on, allowing a user to begin performing camera functions. Substantially simultaneously a camera software interface 516 is activated helping the device perform the camera functions. In some implementations, the camera software interface can be accessed through the display screen 305; which is the same physical display 335 as that shown in the phone orientation 330. However, here it is used to assist in camera-orientated functions, such as for displaying previously-taken pictures, as a viewfinder, for editing, and so on.

At decision block 506 it is determined if the device is in the media orientation. An exemplary media orientation is shown at 315. Here, the camera lens can also clearly be seen as being on the reverse side of the display screen 305. Once determined to be in a media orientation, processing moves to block 512 where a media hardware interface is activated 514. This hardware interface may be a clickwheel, a navigation pad, dedicated buttons (for functions such as stop, pause, play, fast forward, download, etc) some combination, or some other inventive device altogether. In one embodiment, the hardware interface can be used without reference to a display screen. In another embodiment, the display screen, even though on the flip side of the device, provides information that enhances the media experience, such as quick methods to navigate to a desired song, methods to access increased functionality such as enhanced download capabilities, and so forth.

At block 520 a notification of an outside event is received. This outside event may be an incoming call, or an alert such as a calendar reminder or an email notification. Processing continues at block 522, where the event is performed. This event may be received when the device is in any orientation (i.e., camera, media, or phone) and in some instances may be performed also while the event is in its current orientation. For example, if the device is in the camera orientation 300, selecting a dedicated button on the keypad 340 associated with the phone orientation 330 may answer the call. Other embodiments require that the device be rotated back into the appropriate format prior to performing the desired function. In such an embodiment, when a call is received (for example) 520, the user must return the device to the phone orientation 330 prior to answering the call 522.

VII. Alternatives

Having described and illustrated the principles of our invention with reference to the illustrated embodiments, it will be recognized that the illustrated embodiments can be modified in arrangement and detail without departing from such principles.

Elements of the illustrated embodiment shown in software may be implemented in hardware and vice-versa. Also, the technologies from any example can be combined with the technologies described in any one or more of the other examples.

In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We therefore claim as our invention all subject matter that comes within the scope and spirit of these claims.

We claim:

1. A portable camera phone, comprising:
   a pivoting module;
   an interface module;
   the pivoting module rotationally coupled to the interface module along an essentially vertical axis of the interface module; the pivoting module comprising:
      a camera orientation,
      a media orientation, and
      a phone orientation;
   the interface module comprising a given hardware interface and an associated orientation comprising:
      a camera hardware interface associated with the camera orientation;
      a phone hardware interface associated with the phone orientation; and
      a media hardware interface associated with the media orientation;
   wherein when the mobile device is in the given orientation the associated interface is automatically activated such that the associated hardware interface can be used without further action by a user.

2. The portable camera phone of claim 1 further comprising media functions associated with the media orientation and wherein the media functions comprise at least one of listening to a radio, watching a video, watching TV, playing stored music, and downloading music from an external source.

3. The portable camera phone of claim 1 wherein the media interface comprises at least one of a click wheel, a navigational keypad, a numeric keypad, an alphanumeric keypad, or a joystick.

4. The portable camera phone of claim 3 wherein the navigational keypad comprises at least one of:
   a dedicated navigation button, comprising at least one of right, left, up, down, and select;
   a dedicated function button, comprising at least one of stop, pause, play, skip forward, skip backwards, or download; or
   a dedicated pause button.

5. The portable camera phone of claim 1 wherein the rotational coupling comprises at least one of:
   a phone detector switch to detect when the portable camera phone is in a phone orientation;
   a camera detector switch to detect when the portable camera phone is in a camera orientation; or
   a media detector switch to detect when the portable camera phone is in a media orientation.

6. The portable camera phone of claim 1 wherein the rotational coupling allows a maximum of 180 degree rotation.

7. The portable camera phone of claim 1 further comprising a display, the display having a camera context, a phone context and a media context, and wherein when the portable camera phone is placed in the camera orientation substantially automatically displaying the camera context; when the phone is placed in the media orientation substantially automatically displaying the media context; and when the phone is placed in the phone orientation substantially automatically displaying the phone context.

8. The portable camera phone of claim 7 wherein the digital display reflects at least one action not currently initiated by the user, and not necessarily associated with the given orientation.

9. The portable camera phone of claim 8 wherein information not immediately initiated by the user comprises notification of at least one of: an incoming call, a calendar event reminder, an email receipt, an alarm, or a message.

10. The portable camera phone of claim 7 wherein each of the contexts has an associated interface, and wherein displaying the context comprises displaying a screen related to the associated interface.

11. The portable camera phone of claim 1, wherein the camera orientation comprises the pivoting module being rotated 90 degrees from the phone orientation.

12. The portable camera phone of claim 1, wherein the media orientation comprises the pivoting module being rotated 90 degrees from the camera orientation.

13. The portable camera phone of claim 1, where the camera interface further comprises at least two selectable camera hardware functions and wherein the at least two selectable hardware functions are taken from a list comprising: movie playing mode, slide mode, taking pictures mode, editing mode, redeye mode, flash mode, zoom mode, or user-selectable mode.

14. The portable camera phone of claim 13 wherein at least one selectable camera hardware function is visible only when the portable camera phone is in the camera orientation.

15. The portable camera phone of claim 1 further comprising a keypad and wherein activating the phone interface comprises accepting input from the keypad.

16. A method of moving between different communication device features comprising:
in response to a modification of a physical orientation of the communication device, the physical orientation comprising at least two of a phone orientation, a camera orientation and a media orientation, automatically switching between different features sets of the device, said switching comprising:
if in the phone orientation then substantially immediately activating a software phone interface associated with a display, and substantially immediately activating at least a hardware interface operable for making phone calls and for receiving phone calls;
if in the camera orientation then substantially immediately activating at least a camera hardware interface and a camera software interface;
if in the media orientation, then substantially immediately activating a software media interface, and a hardware media interface.

17. A computer readable medium having stored thereon computer-readable instructions which, when executed by the computer, cause the computer to perform the method of claim 16.

18. The method of claim 16 further comprising receiving an outside event notification and wherein the outside event can be performed when the communication device is in any of the physical orientations.

19. The method of claim 18 wherein the outside event is a phone call and performing the outside event is answering the phone call.

20. A transformable media smartphone comprising:
a transformable phone shape, the phone shape transformable into a media shape by rotation along a central axis of at least a portion of the smartphone and transformable into a camera shape by rotation along the central axis of at least a portion of the smartphone; such that when the smartphone is transformed into a the phone shape phone actions are substantially immediately operational without other user action, when the smartphone is transformed into the media shape media actions are substantially immediately operational without other user action, and when the smartphone is transformed into the camera shape, camera actions are substantially immediately operational without other user action.

* * * * *